(12) United States Patent
Vignocchi et al.

(10) Patent No.: US 6,557,674 B2
(45) Date of Patent: *May 6, 2003

(54) HYDRAULIC OR HYDROPNEUMATIC SHOCK ABSORBER OR TELESCOPIC SUSPENSION, EQUIPPED WITH BUILT-IN COMPENSATOR, HAVING SMALL OVERALL DIMENSIONS, EASY TO CARRY OUT AND HIGHLY RELIABLE

(75) Inventors: Loris Vignocchi, Zola Predosa (IT); Sandro Musiani, Marzabotto (IT)

(73) Assignee: Marzocchi S.p.A., Bologna (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,112

(22) Filed: Sep. 30, 1999

(65) Prior Publication Data

US 2002/0060111 A1 May 23, 2002

(30) Foreign Application Priority Data

Dec. 3, 1998 (IT) ............................... BO98A0684

(51) Int. Cl.[7] ................... F16F 9/00; F16F 9/48
(52) U.S. Cl. .................. 188/315; 188/286; 188/298
(58) Field of Search .................. 188/287, 298, 188/315, 318, 313, 314, 297, 301, 312, 316, 317, 286; 267/64.15, 64.26, 64.27

(56) References Cited

U.S. PATENT DOCUMENTS

| 2,436,573 A | * | 2/1948 | Heynes | 267/64.15 |
| 2,571,279 A | * | 10/1951 | Myklestad | 188/315 |
| 2,802,664 A | * | 8/1957 | Jackson | 188/315 |
| 3,039,760 A | * | 6/1962 | Jackson | 188/315 |
| 3,052,328 A | * | 9/1962 | Brueckner | 188/289 |
| 3,151,706 A | * | 10/1964 | Dillenburger et al. | 188/298 |
| 3,392,849 A | * | 7/1968 | Rasmussen | 188/298 |
| 3,556,268 A | * | 1/1971 | Fister | 188/315 |
| 3,771,626 A | * | 11/1973 | Palmer | 188/298 |
| 3,774,895 A | * | 11/1973 | Willich et al. | 267/64.27 |
| 3,874,485 A | * | 4/1975 | Smith | 188/315 |
| 3,891,199 A | * | 6/1975 | Willich et al. | 188/315 |
| 3,944,031 A | * | 3/1976 | Cholet et al. | 188/315 |
| 4,226,408 A | * | 10/1980 | Tomita et al. | 188/315 |
| 4,257,314 A | | 3/1981 | Deschner | |
| 4,257,499 A | * | 3/1981 | Deschner | 188/315 |
| 5,295,563 A | * | 3/1994 | Bennett | 188/318 |
| 6,076,814 A | * | 6/2000 | Grundei | 188/315 |

FOREIGN PATENT DOCUMENTS

| DE | 932 949 C | 9/1955 |
| EP | 0 472 920 A | 3/1992 |
| EP | 0 855 533 A | 7/1998 |
| FR | 1 056 116 A | 2/1954 |
| FR | 1 060 812 A | 4/1954 |
| FR | 1 076 192 A | 10/1954 |
| GB | 2 057 089 A | 3/1981 |

* cited by examiner

*Primary Examiner*—Jack Lavinder
*Assistant Examiner*—Thomas J. Williams
(74) *Attorney, Agent, or Firm*—Ward & Olivo

(57) ABSTRACT

The compensator consists of at least one flexible and preferably elastic braiding (8), fitted up outside onto the cylinder (1) of the shock absorber, seal-fastened with its own ends onto said cylinder by means of suitable fastening means (19, 10) and carried out in such a way as to contain a chamber with variable volume (C) occupied by oil and communicating with at least one of the inside chambers of the shock absorber, for instance with the chamber with the larger volume, by means of holes provided on said cylinder.

10 Claims, 2 Drawing Sheets

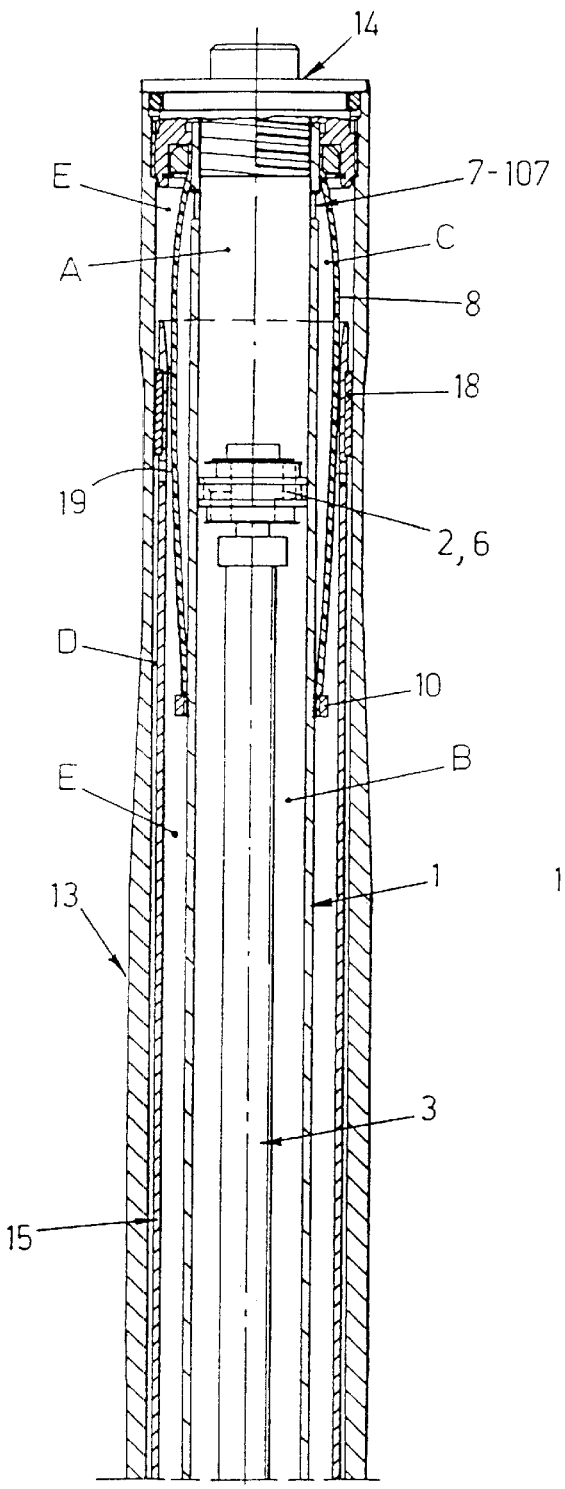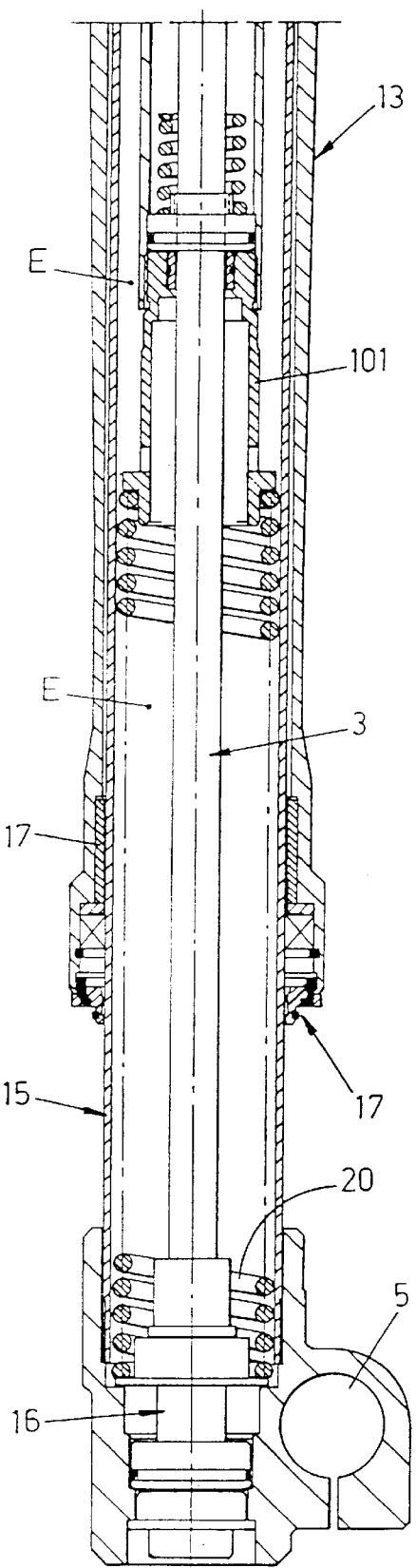
Fig. 5
Fig. 4

HYDRAULIC OR HYDROPNEUMATIC SHOCK ABSORBER OR TELESCOPIC SUSPENSION, EQUIPPED WITH BUILT-IN COMPENSATOR, HAVING SMALL OVERALL DIMENSIONS, EASY TO CARRY OUT AND HIGHLY RELIABLE

BACKGROUND OF THE INVENTION

The present invention relates to shock absorbers and to telescopic suspensions. In general, both hydraulic and hydropneumatic, equipped with a compensator to compensate the various volume changes in the chambers placed opposite the piston in the telescopic system when one of such chambers is occupied by a stem fastened to the piston of the telescopic system. The compensator is connected to one of the inside chambers of the telescopic system, usually to the one with the larger volume. In some cases compensators are mounted at the interior and on the It bottom of said chamber with the larger volume, thus increasing the overall length of the telescopic system, and more often they are placed outside, laterally or even in a distant position from the telescopic system itself, with a flexible pipe representing the connection to said chamber with the larger volume.

Compensators of the known type substantially consist of a chamber divided into two portions by a piston with lateral seal, or by a membrane made of flexible and possibly elastic material, one portion of said chamber being full of oil and connected to the chamber with the larger volume of the telescopic system, the other chamber portion is usually occupied by a pressurized gas, whose pressure is often adjustable, so as to ensure a rapid return of the oil from the compensator back to the inner circuit of the telescopic system when the latter is making the extension stroke, also to avoid cavitation phenomena within said circuit. From above it results that compensators of the known type substantially involve a problem of space and they normally require a pressurizing chamber opposite to the one occupied by the oil.

SUMMARY OF THE INVENTION

The present invention aims at overcoming these and other disadvantages from the known art by means of the following solution idea. At least one tubular, flexible and preferably elastic, impermeable and oil-resistant braiding is fitted up on the outside lateral surface of the cylinder in the telescopic system, said braiding being seal-fastened with its ends onto said cylinder, for instance by means of bands or other suitable means, so as to form at its interior a compensation chamber with changing volume itself, said chamber being connected to at least one of the inner chambers of the telescopic system, for instance to the chamber with the larger volume, by means of holes on the ends of said chamber. The compensator thus obtained presents extremely limited overall dimensions and does not require a pressurization from outside since its emptying is substantially helped by the elastic memory of the braiding which forms same.

BRIEF DESCRIPTION OF THE DRAWINGS

Further features of the present invention and the advantages deriving from them will become more evident from the following description of some preferred embodiments of said invention, shown as a mere non-limiting example in the figures of the two drawing tables enclosed where:

FIGS. 4 and 5 show a longitudinal section, divided into two portions, of a fork leg, particularly suitable for the so-called mountain bikes or for other two-wheel vehicles.

DETAILED DESCRIPTION OF A REFERRED EMBODIMENT

Figure 1:
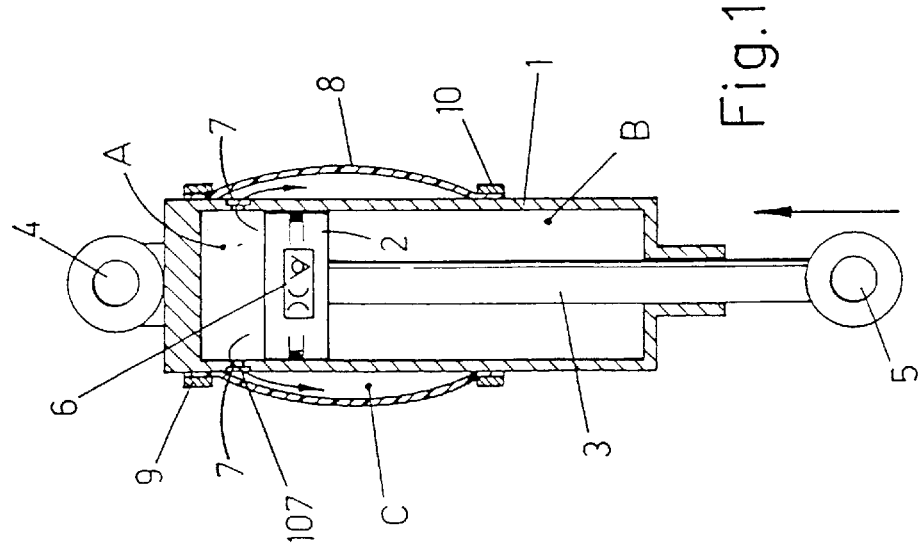
FIG. 1 shows a schematic longitudinal section of a shock absorber equipped with the compensator according to the present invention.

In FIG. 1 the numeral 1 indicates the cylinder of a shock absorber, closed at one end containing a piston 2 connected to a stem 3 which comes out of the other end of the cylinder 1 axially and with a lateral seal, said piston with a lateral seal sliding within the cylinder. The numerals 4 and 5 indicate the connection points for the shock absorber to the two points of the mechanism to be cushioned, said points being usually stressed through reciprocal distancing using an elastic means, which is not shown here, so that the shock absorber in its rest position has its stem 3 extending from the cylinder 1. The inside chambers A and B of the cylinder 1, defined by the opposite sides of the piston 2, are full of oil or any other suitable liquid, and on the piston 2 valves of any suitable type are supplied, which may also be different from those shown in the schematic with the numeral 6, said valves being possibly adjustable and able to control the passage of oil between chambers A and B during the extension and retraction stroke of the stem 3, so as to ensure the necessary cushioning of the stresses to which the telescopic unit of the present invention is subjected.

In order to compensate for the various volume changes in the chambers A and B, said chamber A being larger in volume than chamber B since it is not occupied by the stem 3, the present invention provides, for example, for lateral openings 7 in correspondence to the base of the chamber with the larger volume A and, mounted on the outside of the cylinder 1, a water tight sock 8, said sock being flexible and preferably made of any suitable, elastomeric and oil-resistant material, of a suitable length and thickness and being self-fastened by its own ends onto the cylinder 1, for instance with centripetal tightening methods 9 and 10, for instance with clamps or groups of cone-shaped rings with different hardness, whose contact surfaces are equipped with anti-unthreading stripes (FIG. 3), similar to those which are used for the reciprocal seal-connection of pipes within hydraulic circuits, so that said sock 8 and the outside wall of the cylinder 1 onto which said sock is placed, together form a compensation chamber C sealed towards the outside, which can change in volume due to the flexibility and elasticity of said sock 8 and which communicates with the chamber A of the shock absorber through the openings 7. In order to ensure a correct closure of the ends of the braiding 8, its own ends of the braiding and/or the portions of it touching the cylinder 1 or the tightening methods 9, 10 can be shaped in any suitable way. The chamber C is also full of oil. In particular, when the stem 3 is in its extended or rest position, the chamber C shows the smallest volume. When the stem 3 is stressed by retraction, the oil partly flows from chamber A to chamber B through the valve system 6 of the piston 2 and the surplus flows into the compensation chamber C through the openings 7. This oil will then return to the chamber A when the stem 3 makes its extension stoke. At this latter stage, the oil must freely flow into the chamber A without causing cavitation phenomena, and this is prevented by the elasticity memory of the sock 8 and the wide passage formed by the openings 7.

Figure 3:
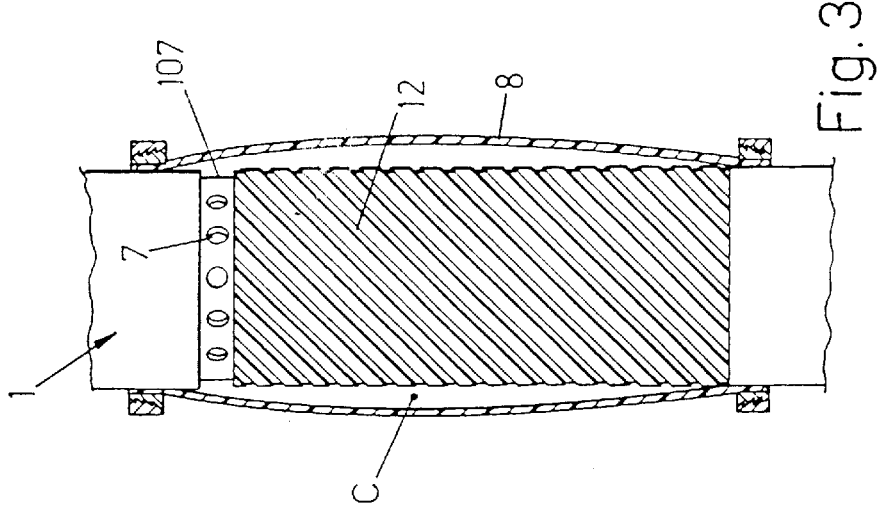
FIGS. 2 and 3 show possible outside structures of the wall supporting the elastic braiding of the compensator.
Figure 2:
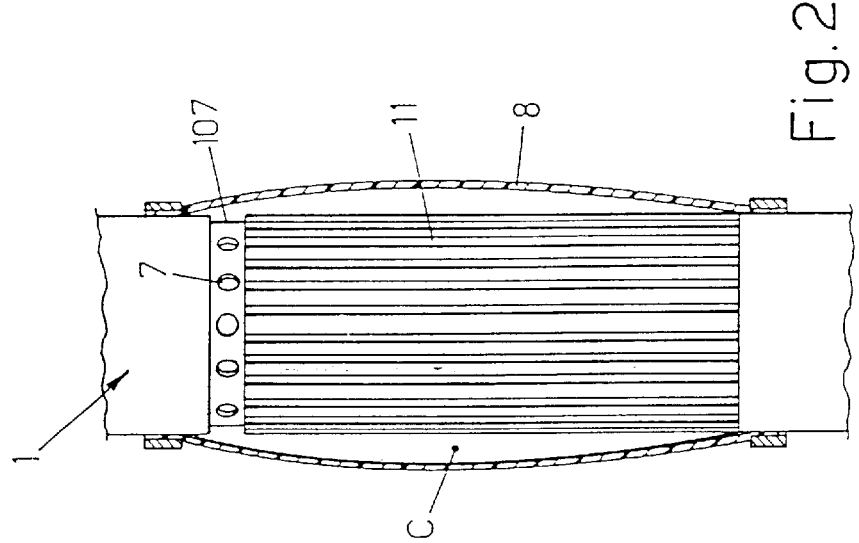

To ensure the free flow of oil between the chambers A and C, it is by preference foreseen that the openings 7 open into an outside ring-shaped recess 107 of the cylinder 1 and it can also be foreseen that small grooves would open in such a recess, said grooves taking up the whole length or part of the outside surface of the cylinder 1 forming said chamber C, for example small rectilinear grooves 11 as shown in FIG. 2 or small helicoidal grooves 12 as shown in FIG. 3. The longitudinal grooves 11 or 12 can also be forecast onto an intermediate portion of the inside lateral surface of the braiding 8. According to another executive variation of the form, as an alternative to or combined with the solution shown in FIGS. 2 or 3, it can be foreseen that the outside lateral surface of the cylinder 1 is suitably cone-shaped in the portion which forms chamber C, or it can be foreseen that the sock 8 is made with a differentiated elasticity in its length, so as to avoid that the sock 8, during its elastic contraction movement, blocks the openings 7, at least until the chamber C becomes empty.

If the sock 8 has to be used on shock absorbers or on telescopic systems where it could be visible, some means can be provided for to protect the sock itself, for instance by means of a flexible, possibly bellows-like sheath, made of any material suitable for this purpose.

With reference to FIGS. 4 and 5, the application of the discussed improvements in one of the legs of a fork, in particular for mountain bikes, is now described, said fork consisting of two identical cushioned telescopic legs, connected one to the other on their upper end by means of cross pieces supporting the axis of the handlebar and supplied on their lower ends with attachments for their connection to the wheel hub. In such figures, the numeral 13 indicates the sheath or outer sliding tube, i.e., the tubular elements with the larger section of the leg, which is closed on its upper end by means of a plug 14 and in which the tubular stem 15 slides telescopically being closed on its lower end by means of a plug 16 and supplied with an extension 5 for connection to the wheel axis. In the example shown, the sheath 13 is supplied on its own lower end with a sealed closure system 17 and a guiding ring 117 with an inside diameter smaller than the diameter of the sheath itself, said guiding ring containing the stem 15 with lateral seal sliding within itself, said stem being provided on its upper end with an outside ring 18 which slides with a lateral seal on the surface of the sheath itself, so that the sliding surface for the portions 13 and 15 is limited to the surface of the rings 117 and 18 and in such a way that there is a ring-shaped chamber D between the two portions, which is in constant communication with the inside chamber E of the telescopic system 13, 15 through the openings 19 obtained on the upper end of the stem 15 under the sliding ring 18. The air space D can freely take in or discharge air, through the holes 19 from or into the chamber E and it can receive a small amount of oil for the lubrication of the relatively movable surfaces of the parts 13 and 15 from said chamber E. The chamber E of the leg is partly occupied by lubricating oil, preferably of the high-density type, which can reach the openings 19 through the periodic overturning of the fork and because of the emulsification of the oil itself with the air contained in the chamber E.

The plug 14 closes the end of the cylinder 1 of a shock absorber as described in FIG. 1, placed within the telescopic system 13, 15, coaxially with the stem 3 which may be oriented in the same direction as the stem 15 and integral with the group formed by the plug 16 together with the coupling 5. On the plug 16 adjusting means can be provided, which are not shown here since they are known in other types of suspensions manufactured by the applicant company and since they have no influence on the understanding of the present invention, to adjust the valve means 6 placed on the piston 2 of the shock absorber. Other adjusting means, which are not shown either can be provided on the plug 14, whose purpose is to adjust possible valve means placed within the chamber A of the shock absorber, said means not being shown either, whose purpose is to adjust the position of the fork formed by said legs, during both the compression and the extension stage. The fork shaft also contains the holes 7 together with the outside ring-shaped recess 107 on the upper end of the cylinder 1 and the impermeable, flexible and elastic braiding 8 outside said cylinder 1, fastened with its ends onto said cylinder by means of the clamping elements 9 and 10. The braiding is shaped in such a way as not to interfere with the upper end of the sheath 15 of the telescopic shaft. The chambers A, B and C of the shock absorber are full of a low viscosity liquid, which is sufficiently stable to changes in the fork operating temperature. Thanks to the diaphragm 8 the lubricating oil located in chamber E of the telescopic system 13, 15 will never mix with the oil in the loop of the shock absorber. An elastic means 20 consisting for instance of a spring or of a group of elastomer elements is provided within the stem 15, outside the stem 3 of the shock absorber, bearing with one end onto the bottom of the stem 15 and with the other end onto a cup 101 of the cylinder 1, so as to urge to extension the fork log. It is understood that the fork shaft shown in FIGS. 4 and 5 can also be reversed, that is to say, with the stem 15 oriented upwards and connected to the bike handlebar and with the sheath 13 oriented downwards and connected to the wheel axis of the bike itself, thus resulting in a better lubrication of thin portions 13, 15, even with a small amount of oil within the chamber E. It is also understood that the shock absorber equipped with the compensator can be fitted into the telescopic system 13, 15 with a reversed orientation with respect to the orientation shown in FIGS. 4 and 5. Finally, it is evident how the pressure within chamber E of this fork improves the elastic recovery of the braiding 8 and how it can even allow the use of a braiding whose only feature is flexibility.

Therefore, it is obvious that the description has referred to a preferred embodiment of the present invention, which may undergo a plurality of variations and changes, particularly in its realization, without however departing from the informing principle of the invention, as described above, as shown and as claimed below.

What is claimed is:

1. An improved shock absorber, wherein said shock absorber comprises:

first and second sliding tubes having lubricating material therein, said first sliding tube closed at a first end and traversed with lateral seal at a second end by said second sliding tube, said second sliding tube being closed on a bottom end;

a cylinder axially positioned within said sliding tubes, said cylinder closed at a first end and fastened to said first end of said first sliding tube, said cylinder having a dampening fluid therein;

a stem having a piston at one end thereof, said stem axially positioned with lateral seal within said cylinder such that first and second chambers are formed within said cylinder; and a compensator axially positioned around and secured to said first end of said cylinder such that a third chamber is formed therebetween;

wherein said piston comprises at least one valve to allow flow of said dampening fluid between said first and second chambers; and wherein said cylinder comprises at least one opening in the region said compensator is axially positioned to allow flow of said dampening fluid between said second and third chambers.

2. A shock absorber according to claim 1, wherein during compression of said shock absorber said dampening fluid flows from said second chamber into said third chamber and from said second chamber into said first chamber.

3. A shock absorber according to claim 1, wherein during expansion of said shock absorber said dampening fluid flows from said third chamber into said second chamber and from said first chamber into said second chamber.

4. A shock absorber according to claim 1, wherein said valve is a one-directional valve.

5. A shock absorber according to claim 1, wherein said compensator comprises a flexible material.

6. A shock absorber according to claim 1, wherein a portion of said cylinder surrounded by said compensator comprises grooves.

7. A shock absorber according to claim 6, wherein said grooves are positioned longitudinally on said cylinder.

8. A shock absorber according to claim 6, wherein said grooves are positioned diagonally on said cylinder.

9. A shock absorber according to claim 1, wherein said shock absorber further comprises:
 a spring for urging expansion of said shock absorber, said spring positioned axially around said stern with an upper end of said spring in contact with said second end of said cylinder.

10. A shock absorber according to claim 1, wherein said shock absorber further comprises:
 at least one elastomer for urging expansion of said shock absorber, said at least one elastomer positioned axially around said stem with an upper end of said at least one elastomer in contact with said second end of said cylinder.

* * * * *